United States Patent [19]

Nate et al.

[11] Patent Number: 4,946,501
[45] Date of Patent: Aug. 7, 1990

[54] ALLOY TARGET FOR MAGNETO-OPTICAL RECORDING

[75] Inventors: Tasuo Nate; Toshio Morimoto; Kouichi Oka, all of Ichikawa; Shinobu Endo, Komae, all of Japan

[73] Assignee: Sumitomo Metal Mining Company Limited, Japan

[21] Appl. No.: 421,958

[22] Filed: Oct. 16, 1989

[30] Foreign Application Priority Data

Oct. 15, 1988 [JP] Japan ................................ 63-258381

[51] Int. Cl.$^5$ ................................................. B22F 9/00
[52] U.S. Cl. ........................................ 75/246; 75/245; 148/145; 148/301; 252/62.55; 420/416
[58] Field of Search ............... 75/246, 245; 252/62.55; 420/416; 148/301, 105

[56] References Cited

U.S. PATENT DOCUMENTS 4,620,872 11/1986 Hijikata et al. ...................... 75/246
4,770,702 9/1988 Ishigaki et al. ...................... 75/246
4,824,481 4/1989 Chatterjee et al. .................. 75/246

Primary Examiner—Stephen J. Lechert, Jr.
Attorney, Agent, or Firm—Watson, Cole, Grindle & Watson

[57] ABSTRACT

An alloy target for magneto-optical recording having component and composition comprising 10 to 50 atom % of at least one rare earth element from Sm, Nd, Gd, Tb, Dy, Ho, Tm and Er, the balance being substantially at least one transition metal from Co, Fe and Ni, and having a mixed structure comprising a phase of intermetallic compound of the rare earth element and the transition metal and a fine mixed phase of the rare earth element and intermetallic compound of the rare earth element and the transition metal or having a mixed structure comprising the structure above and a phase of the rare earth element alone. The target has uniform composition and high strength free from cracking, etc., shows less composition difference between film and target and less change of the film composition with elapse of sputtering time.

8 Claims, No Drawings

ALLOY TARGET FOR MAGNETO-OPTICAL RECORDING

BACKGROUND OF THE INVENTION

1. Field of the Invention

This invention relates to an alloy target which is suitable for use in the manufacture of a magneto-optical recording medium by a sputtering method.

2. Description of the Prior Art

A magneto-optical memory has been drawing an attention that facilitates the erasure and recording of information in recent years, and single-crystal materials such as garnets, polycrystalline materials such as MnBi and PtCo, or amorphous materials such as alloys of rare earth elements and transition metals are known for the material of the magneto-optical memory.

Among them, an amorphous alloy comprising rare earth element and transition metal (Tb-Fe-Co, Gd-Tb-Fe, etc.) provides a variety of advantages, for example, requiring only a small amount of energy for recording, free from any grain-boundary noise, or capable of producing large-sized material relatively easily. As a method of manufacturing a thin film of such amorphous alloy, a sputtering method of causing ions to collide with a target to form a thin film on a substrate positioned near the target is often used.

Among the materials for a target used in the sputtering, there has been proposed, for example, a mixed structure composed of a phase of intermetallic compound of rare earth element and transition metal and a phase of transition metal alone, having features of (1) less cracking and (2) satisfactory uniform composition (Japanese Laid-Open Patent Application No. Sho 62-70550).

However, the target material involves drawbacks such as (1) composition of the film obtained is greatly different from that of the target, (2) permeability is so high that only a small magnetic flux leaks from the surface of the target, resulting in a low sputtering efficiency and thereby a reduced efficiency of use of the target, especially when a magnetron sputtering device is employed and (3) the surface of the target shows remarkable change in the shape regarding (2) above, which causes change in composition of the film with lapse of sputtering time.

The present inventors have made earnest study for overcoming such problems and obtaining such a target as (1) being less cracking, (2) capable of providing satisfactory uniform composition of the film, (3) having less difference in the composition between the film and the target, (4) capable of achieving a high efficiency of using the target and (5) causing no change in the composition of the resultant film with lapse of sputtering time, and have accomplished the present invention on the finding that the foregoing object can be attained by incorporating, into the structure of a target, not a phase of transition metal alone but a fine mixed phase of rare earth element and intermetallic compound of rare earth element and transition metal.

SUMMARY OF THE INVENTION

That is, the feature of an alloy target for a magneto-optical recording according to the present invention resides in component and composition comprising 10 to 50 atom % of at least one rare earth element from Sm, Nd, Gd, Tb, Dy, Ho, Tm and Er and the balance substantially consisting of at least one transition metal element from Co, Fe and Ni, and a mixed structure comprising a phase of intermetallic compound the rare earth element and the transition metal, and a fine mixed phase comprising the rare earth element and an intermetallic compound of the rare earth element and the transition metal.

Another feature of the alloy target for use with magneto-optical recording according to the present invention resides in component and composition comprising 10 to 50 atom % of at least one of rare earth element from Sm, Nd, Gd, Tb, Dy, Ho, Tm and Er and the balance substantially consisting of at least one transition metal element from Co, Fe and Ni, and a mixed structure comprising a phase of an intermetallic compound of the rare earth element and the transition metal, a fine mixed phase comprising the rare earth element and an intermetallic compound of the rare earth element and the transition metal, and a single phase of the rare earth element.

According to the present invention, it is possible to provide an excellent target having uniform composition, high strength free from cracking, chipping, etc. and, with less difference in the composition between target and film, less change of the film composition with elapse of time and good efficiency of utilizing the target.

DETAILED DESCRIPTION OF THE INVENTION

It is necessary that the component and composition of the alloy target according to the present invention comprises from 10 to 50 atom % of at least one rare earth element from Sm, Nd, Gd, Tb, Dy, Ho, Tm and Er and the balance substantially consisting of at least one transition metal element from Co, Fe and Ni. If the amount of the rare earth element is less than 10 atom % or more than 50 atom %, the magneto-optical properties of the thin film obtained by the sputtering are not satisfactory.

The alloy target of the present invention may include those impurities, for example, Ca, Si, C, P, S and Mn which may be intruded inevitably in view of the production.

The structure of the alloy target according to the present invention has a mixed structure comprising a phase of an intermetallic compound of the rare earth element and the transition metal, and a fine -mixed phase comprising the rare earth element and an intermetallic compound of the rare earth element and the transition metal, or a mixed structure comprising the phases as described above and a single phase of the rare earth element.

The fine mixed phase comprises the rare earth element and the intermetallic compound of the rare earth element and the transition metal finely mixed, which is formed by reaction such as of eutectic, peritectic or peritectoeutectic reaction, etc. when molten material is cooled to a normal temperature. In addition, this may be a crystalline structure formed by heating an amorphous structure caused by rapid quenching. The mixed phase acts so as to (1) form a binding phase for the brittle intermetallic compound phase, (2) make the film composition uniform and (3) reduce the difference in the composition between the target and the film. It is preferred that the phase has a size not greater than 500 μm and is contained at least 3 % by volume in order to provide the foregoing effects effectively. The shape may be granular, angular, or columnar with no particular restrictions. It is essential that a phase of transition metal alone is not substantially present. If it is present, it will cause undesired effect on the efficiency of utilizing the target and on the change of the film composition with elapse of sputtering time. The phase of the intermetallic compound of the rare earth element and the transition metal as another phase may be single or in plurality and there is no particular restriction for the shape and the size thereof.

For the single phase of the rare earth element, there is no particular difference regarding the function between the case where it is present as another phase or it is not present.

Next, an example of a method for manufacturing the alloy target according to the present invention is explained.

For manufacturing an alloy target of this invention, it is necessary to use an alloy powder of rare earth element - transition metal prepared by a melting method, that is, an alloy powder having such a hysteresis as once being molten as a rare earth element - transition metal alloy, or to form a liquid phase upon sintering by the powder metallurgy described later. Such as alloy powder includes those (1) prepared by physically pulverizing a cast alloy ingot obtained by melting rare earth element and transition metal, (2) prepared by a plasma REP process (Rotation Electrode Process) using a rare earth element -transition metal alloy as an electrode, (3) prepared by pulverizing a flake obtained by rapidly quenching to solidify a molten alloy of rare earth element - transition metal by such a cooling device as a roll at a normal temperature.

In the case of using a powder other than the alloy powder described above, an example of such powder can include those prepared by a reduction - diffusion process of mixing a powder of rare earth oxide, a transition metal powder and a reducing agent such as metal calcium and heating them to cause reaction such as reduction of the rare earth oxide and the diffusion into the transition metal. However, use of the single transition metal element or the alloy powder thereof requires a care in that a single phase of the transition metal is not present in the structure of the alloy target and it is preferred to use fine particles as much as possible if used.

The thus obtained alloy powder is then used for the sintering by powder metallurgy to produce an alloy target as a sintered product. That is, it is molded, for example, by simply compressing the alloy powder at normal temperature under the pressure of 0.5-5 t/cm$^2$ or by a hydrostatic press under the pressure of 0.5-2 t/cm$^2$. And is then sintered in a vacuum or an Ar atmosphere at a temperature of 700-1300° C. for from 0.5 to 5 hours, in a vacuum under the pressure of 0.1-0.5 t/cm$^2$ at a temperature of from 600 to 1200° C. for 1-5 hours (a hot pressing method) or at a temperature of 600-1200° C. under the pressure of 0.1-2 t/cm$^2$ for 0.5 to 5 hours after sealing in an elastic body (a hot hydrostatic pressing process).

The alloy target manufactured by the method as described above exhibits the structure according to the present invention. It is assumed that the fine mixed phase of the rare earth element and the intermetallic compound of the rare earth element and the transition metal in the structure was present in the alloy powder prepared by the melting process or was newly present due to the formation of the liquid phase upon sintering by the powder metallurgy described above.

The present invention is now explained more specifically referring to examples.

EXAMPLE

Example 1

With an aim of manufacturing an alloy target of a composition comprising $Tb_{25}Fe_{68}Co_7$, Tb-Fe alloy powder prepared by the plasma REP process (weight composition ratio Tb:Fe =88:12, average grain size : 100 μm) and Tb-Fe-Co alloy powder prepared by the reduction -diffusion process (weight composition ratio Tb:Fe:Co=34.5 : 58.7 : 6.8, average grain size: 60 μm) (all having purity of 99.9 % by weight or high the blending raw material in the examples used above and hereinafter) were blended and mixed in an argon gas atmosphere in a ball mill for one hour.

The mixed powder is charged in a molding device made of graphite of 152 mm inner diameter and hot-pressed. As the conditions for the hot pressing, the degree of vacuum was set to $1\times10^{-4}$ Torr and a pressure of 100 kg/cm$^2$ was applied for pressing the powder till a temperature was elevated to 860° C. After the temperature elevation, the pressure was increased to 250 kg/cm$^2$ and the temperature was maintained for 30 min and then cooled to the room temperature.

The sintering product which was the alloy target taken out from the molding device was inspected for the cracking, chipping. They were found not at all by visual inspection and neither observed by the inner inspection under transmission X-ray irradiation. Further, the composition and the result of the microscopic observation for the structure of the sintered product are shown in Table 1. Among them, the size of the phase and the % by volume in the result of the microscopic observation were determined by intercept method. The single phase of the rare earth element and the phase of the transition metal alone were not recognized.

Using such alloy target (151 mm diameter, 3 mm thickness), a thin film (3000 Å thickness) was prepared by using a sputtering process (Ar gas pressure : $6\times10^{-5}$ Torr, sputtering powder : 4 W/cm$^2$, substrate : soda glass). Sputtering was sufficiently stable during preparation in any of the tests. Further, the alloy target after the preparation was observed and inspected for the cracking, chipping, etc. in the same manner as above and they were not found. After preparing the thin film, measurement was made for (1) scattering in the film composition, (2) difference in the composition between the target and the film, (3) efficiency of utilizing the target and (4) change of the film composition with elapse of sputtering time.

The measuring methods (1) –(4) are as described below.

(1) Scattering in the film composition :

Total amount of the rare earth element is quantitatively analyzed by EPMA at six points each with 30 mm radial interval situated from the position just above the center of the target of the substrate as an original point, to determine the scattering (range).

(2) Difference in the composition between target and film :

Total amount of rare earth element in the target and the film is quantitatively determined by EPMA, to determine the difference in the composition.

(3) Efficiency of utilizing target :

Reduction in the amount of the target was measured after long time use when the thickness of the target was reduced to 0.5 mm at the thinnest portion.

(4) Change of the film composition with elapse of sputtering time :

Scattering (range) of the total amount of the rare earth element in the thin film was determined at time point for sputtering of 1, 5, 10 and 30 hours respectively.

Results obtained by the above-mentioned measurement are shown in Table 2.

EXAMPLE 2

With an aim of manufacturing an alloy target of a composition comprising $Co_{74}Gd_{26}$, Co-Gd alloy powder prepared by the plasma REP process (weight composition ratio Co:Gd =5 : 95, average grain size : 80 $\mu m$) and Co-Gd alloy powder prepared by the reduction - diffusion process (weight composition ratio Co : Gd =53 : 47, average grain size: 50 $\mu m$) were mixed in an argon gas atmosphere in a ball mill for one hour.

Then, test was conducted in the same procedures as those in Example 1 except for subjecting the mixed powder to hot pressing at 650° C.

The results as those in Example 1 are shown in Table 1 and Table 2.

EXAMPLE 3

With an aim of manufacturing an alloy target of a composition comprising $Tb_{25}Fe_{68}Co_7$, Tb-Fe alloy powder prepared by the plasma REP process (weight composition ratio Tb:Fe =90 : 10, average grain size : 90 $\mu m$), Tb powder prepared by the plasma REP process (average grain size: 100 $\mu m$) and Tb-Fe-Co alloy powder prepared by the reduction - diffusion process (weight composition ratio Tb : Fe : Co =32.6 : 60.5 : 6.9, average grain size : 50 $\mu m$) were mixed in an argon gas atmosphere in a ball mill for one hour.

Then, test was conducted in the same procedures as those in Example 1 except for subjecting the mixed powder to hot pressing at 840° C.

The results as those in Example 1 are shown in Table 1 and Table 2.

EXAMPLE 4

With an aim of manufacturing an alloy target of a composition comprising $Tb_{25}Fe_{68}Co_7$, Tb-Fe alloy powder prepared by pulverizing a cast alloy ingot obtained by vacuum melting (weight composition ratio Tb:Co =95 : 5, average grain size : 80 $\mu m$), Tb powder prepared by the plasma REP process (average grain size: 100 $\mu m$) and Tb-Fe-Co alloy powder prepared by reduction - diffusion process (weight composition ratio Tb : Fe : Co =25.4 : 69.3 : 5.3, average grain size : 50 $\mu m$) were mixed in an argon gas atmosphere in a ball mill for one hour.

Then, test was conducted in the same procedures as those in Example 1 except for subjecting the mixed powder to hot pressing at 820° C.

The results as those in Example 1 are shown in Table 1 and Table 2.

In Examples 2-4, as a result of observation and inspection for the cracking and chipping of the alloy targets before and after the preparation of the thin films, none of them were observed at all.

Comparative Example

With an aim of manufacturing an alloy target of a composition comprising $Tb_{25}Fe_{69}Co_7$, an alloy powder of a composition comprising $Tb_{88}Fe_{12}$ prepared by the plasma REP Process (average grain size: 100 $\mu m$), Fe-Co alloy powder (average grain size: 60 $\mu m$) and metal Fe powder (average grain size: 20 $\mu m$) were mixed in an argon gas atmosphere in a ball mill for one hour.

The alloy powder was charged in a molding device made of graphite with 152 mm inner diameter and applied with hot pressing. As the conditions for the hot pressing, the degree of vacuum was set to $5 \times 10^{-5}$ Torr and a pressure of 200 kg/cm$^2$ was applied for pressurizing the powder till the temperature was elevated to 840° C. After the temperature elevation, the temperature was maintained for one hour while the pressure was kept as it was and then cooled to the room temperature.

The resultant alloy target was analyzed and measured in the same procedures as in Example 1. The results are shown in Tables 1 and 2.

CONVENTIONAL EXAMPLE 1

With an aim of manufacturing an alloy target of a composition comprising $Tb_{25}Fe_{68}Co_7$, high frequency induction melting was applied in an argon gas atmosphere to an alloy of the above-mentioned composition. Then, the alloy was coarsely pulverized in a jaw crusher and a ball mill (in an argon gas atmosphere) and then finely pulverized in a jet mill (in a nitrogen atmosphere).

The alloy powder (average grain size: 10 $\mu m$) was charged in a molding device made of graphite with 152 mm inner diameter and then hot-pressed. As the conditions for the hot-pressing, the degree of vacuum was set to $5 \times 10^{-5}$ Torr and the pressure of 250 kg/cm$^2$ was applied for pressurizing the powder till the temperature was elevated to 1070° C. After the elevation of the temperature, the temperature was maintained at 2 hours while keeping the pressure as it was and then cooled to the room temperature.

The resultant alloy target was analyzed and measured in the same manner as Example 1. The results are shown in Tables 1 and 2.

CONVENTIONAL EXAMPLE 2

With an aim of manufacturing an alloy target of a composition comprising $Tb_{25}Fe_{68}Co_7$, Tb powder prepared by pulverizing a blake obtained by jetting out and rapidly quenching to solidify a molten alloy to a single roll (10 $\mu m$ thickness), Fe-Co alloy powder (average grain size: 200 $\mu m$) and metal Fe powder (average grain size 60 $\mu m$) were mixed in an argon gas atmosphere in a ball mill for one hour.

The mixed powder was charged in a molding device made of graphite with 152 mm inner diameter and hot-pressed. As the conditions for the hot-pressing, the vacuum degree was set to $5 \times 10^{-5}$ Torr and a pressure of 250 kg/cm$^2$ was applied for pressurizing the powder till the temperature was elevated to 680° C. After the elevation of the temperature, the temperature was maintained at 1 hours while keeping the pressure as it was thereafter, heated to 890° C. with no pressure and then cooled to the room temperature.

The resultant alloy target was analyzed and measured in the same manner as in Example 1. The results are shown in Tables 1 and 2.

TABLE 1

| Specimen No. | Composition of sintered product (atom %) Tb | Gd | Fe | Co | Fine mixed phase Type | Size (μm) | Vol % | Phase of rare earth element alone Size (μm) | Vol % | Phase of transition metal alone Size (μm) | Vol % |
| --- | --- | --- | --- | --- | --- | --- | --- | --- | --- | --- | --- |
| Example 1  1 | 25 | — | 68 | 7 | Tb + Fe₂Tb | 30~110 | 19 | — | — | — | — |
| Example 2  2 | — | 26 | — | 74 | Gd + CoGd₃ | 20~90 | 14 | — | — | — | — |
| Example 3  3 | 25 | — | 68 | 7 | Tb + Fe₂Tb | 10~80 | 12 | 60~100 | 5 | — | — |
| Example 4  4 | " | " | " | " | Tb + CoTb₃ | 10~100 | 27 | 50~100 | 3 | — | — |
| Comparative Example  5 | " | " | " | " | Tb + Fe₂Tb | 1~40 | 10 | — | — | 10~50 | 6 |
| Conventional Example 1  6 | " | " | " | " | — | — | — | — | — | — | — |
| Conventional Example 2  7 | " | " | " | " | — | — | — | — | — | 20~100 | 17 |

TABLE 2

|  | Example 1 | Example 2 | Example 3 | Example 4 | Comparative Example | Conventional Example 1 | Conventional Example 2 |
| --- | --- | --- | --- | --- | --- | --- | --- |
| Specimen No. | 1 | 2 | 3 | 4 | 5 | 6 | 7 |
| Scattering in target composition (atom %) | 0.3 | 0.2 | 0.2 | 0.1 | 0.6 | 3.5 | 1.7 |
| Difference in the composition between target and film (atom %) | 0.6 | 0.5 | 0.5 | 0.4 | 1.4 | 7.0 | 1.5 |
| Target utilization efficiency (relative weight value based on specimen No. 5 assumed as 1) | 1.4 | 1.3 | 1.3 | 1.3 | 1.0 | 1.4 | 1.0 |
| Change of film composition with elapse of time (atom %) | 0.3 | 0.3 | 0.6 | 0.5 | 2.7 | 0.4 | 1.8 |

What is claimed is:

1. An alloy target for magneto-optical recording consisting essentially of 10 to 50 atom % of at least one rare earth element selected from the group consisting of Sm, Nd, Gd, Tb, Dy, Ho, Tm and Er, the balance being substantially at least one transition metal selected from the group consisting of Co, Fe and Ni, and having a mixed structure comprising a phase of intermetallic compound of said rare earth element and said transition metal and a finely mixed phase of said rare earth element and intermetallic compound of said rare earth element and said transition metal.

2. An alloy target as set forth in claim 1, further containing at least one element selected from the group consisting of Ca, C, and S.

3. An alloy target as set forth in claim 1, wherein said fine mixed phase has a size up to 500 microns and is present by not less than 3% by volume.

4. An alloy target as set forth in claim 1, wherein the phase of the intermetallic compound of the rare earth element and the transition metal is disposed by not less than 2 phases.

5. An alloy target for magneto-optical recording consisting essentially of 10 to 50 atom % of at least one rare earth element selected from the group consisting of Sm, Nd, Gd, Tb, Dy, Ho, Tm and Er, the balance being substantially at least one transition metal selected from the group consisting of Co, Fe and Ni, and having a mixed structure comprising a phase of intermetallic compound of said rare earth element and said transition metal, a finely mixed phase of said rare earth element and intermetallic compound of said rare earth element and said transition metal, and a phase of said rare earth element alone.

6. An alloy target as set forth in claim 5, further containing at least one element from Ca, C, and S.

7. An alloy target as set forth in claim 5, wherein said fine mixed phase has a size up to 500 microns and is present by not less than 3% by volume.

8. An alloy target as set forth in claim 5, wherein the phase of the intermetallic compound of the rare earth element and the transition metal is disposed by not less than 2 phases.

* * * * *